United States Patent
Ruben et al.

(10) Patent No.: US 7,606,232 B1
(45) Date of Patent: Oct. 20, 2009

(54) DYNAMIC VIRTUAL LOCAL AREA NETWORK (VLAN) INTERFACE CONFIGURATION

(75) Inventors: Karen Ruben, Lexington, MA (US); Mathias Kokot, West Medford, MA (US); Jerome P. Moisand, Arlington, MA (US); Brian M. Sullivan, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 569 days.

(21) Appl. No.: 11/331,584

(22) Filed: Jan. 13, 2006

Related U.S. Application Data

(60) Provisional application No. 60/734,807, filed on Nov. 9, 2005.

(51) Int. Cl.
*H04L 12/56* (2006.01)
*H04L 12/28* (2006.01)
(52) U.S. Cl. ............ 370/392; 370/389; 370/395.3; 370/395.53; 370/400; 370/409
(58) Field of Classification Search ........ 370/392, 370/389, 400, 395
See application file for complete search history.

(56) References Cited

U.S. PATENT DOCUMENTS

| | | | | |
|---|---|---|---|---|
| 5,613,096 | A * | 3/1997 | Danknick | 709/236 |
| 6,570,875 | B1 * | 5/2003 | Hegde | 370/389 |
| 7,079,527 | B2 * | 7/2006 | Owens | 370/352 |
| 7,269,135 | B2 * | 9/2007 | Frick et al. | 370/228 |
| 7,272,137 | B2 * | 9/2007 | Unitt et al. | 370/389 |
| 7,298,705 | B2 | 11/2007 | Shankar et al. | |
| 2002/0019875 | A1 * | 2/2002 | Garrett et al. | 709/230 |
| 2002/0027906 | A1 | 3/2002 | Athreya et al. | |
| 2002/0103921 | A1 * | 8/2002 | Nair et al. | 709/232 |
| 2003/0140153 | A1 * | 7/2003 | Lawrence | 709/230 |
| 2003/0210697 | A1 * | 11/2003 | Mercier | 370/395.1 |

(Continued)

FOREIGN PATENT DOCUMENTS

JP 2005-252762 9/2005

(Continued)

OTHER PUBLICATIONS

U.S. Appl. No. 11/402,145, entitled "Dynamic Building of VLAN Interfaces Based on Subscriber Information Strings," filed Apr. 11, 2006.

*Primary Examiner*—Dang T Ton
*Assistant Examiner*—Robert M Morlan
(74) *Attorney, Agent, or Firm*—Shumaker & Sieffert, P.A.

(57) ABSTRACT

Techniques are described for dynamically building an Ethernet virtual local area network (VLAN) interface in a network device. The techniques allow dynamic building of a second VLAN interface over a first VLAN interface statically built over an Ethernet port configured to support dynamic VLANs in a network device. A network device may receive a plurality of Ethernet packets from subscriber devices and dynamically build a second VLAN interface over the first VLAN interface for each of the subscribers. Once the second VLAN interface is built, the network device dynamically builds interface columns over the second VLAN interface for each protocol associated with the Ethernet packets. The network device may then authenticate a user associated with the plurality of Ethernet packets. Once the user has logged out of the network device, the network device may tear down the interface columns while persistently maintaining the corresponding second VLAN interface.

55 Claims, 8 Drawing Sheets

U.S. PATENT DOCUMENTS

| | | |
|---|---|---|
| 2004/0062004 A1 | 4/2004 | Bearden et al. |
| 2004/0075535 A1* | 4/2004 | Propp et al. ............ 340/310.01 |
| 2004/0088389 A1 | 5/2004 | Shah |
| 2005/0071446 A1* | 3/2005 | Graham et al. .............. 709/223 |
| 2005/0232228 A1 | 10/2005 | Dharanikota et al. |
| 2005/0265397 A1 | 12/2005 | Chapman et al. |
| 2006/0026669 A1* | 2/2006 | Zakas ........................... 726/6 |
| 2006/0126616 A1* | 6/2006 | Bhatia ....................... 370/389 |
| 2006/0245439 A1* | 11/2006 | Sajassi ....................... 370/400 |
| 2006/0274774 A1 | 12/2006 | Srinivasan et al. |
| 2007/0097972 A1 | 5/2007 | Jain et al. |

FOREIGN PATENT DOCUMENTS

| | | |
|---|---|---|
| WO | WO 03/067824 | 8/2003 |
| WO | WO 2005/112363 A1 | 11/2005 |

\* cited by examiner

DYNAMIC VIRTUAL LOCAL AREA NETWORK (VLAN) INTERFACE CONFIGURATION

This application claims the benefit of U.S. Provisional Application No. 60/734,807, filed Nov. 9, 2005, the entire content of which is incorporated herein by reference.

TECHNICAL FIELD

The invention relates to computer networks, and more particularly to interface configuration of network devices.

BACKGROUND

Customer networks are networks established by individuals or companies for internal communication. Customer networks may include local area networks (LAN) or wide area networks (WAN) that comprise a plurality of subscriber devices, such as personal computers, laptops, workstations, personal digital assistants (PDAs), wireless devices, network-ready appliances, filer servers, print servers or other devices. The customer networks may meet customer-specific needs using a number of different communication protocols, such as Asynchronous Transfer Mode (ATM) protocol, Ethernet protocol, Bridged Ethernet protocol, frame relay protocols or other communication protocols. ATM and frame relay protocols, for example, are frequently used for transport of audio, video, and computer data between a source and destination device within a customer network. Such protocols may transfer information in fixed-length units, such as frames.

In order to allow remote customer networks to communicate, Internet Protocol (IP) based communication techniques are being developed that relay frames through an IP-based network, such as the Internet. According to the techniques, a network service provider of the IP network can receive frames from one of the customer networks, encapsulate the frames within packets, and route the packets through the IP network to the other customer network.

Service provider networks include network devices, such as routers, that provide subscriber devices of the customer networks with access to the Internet or another network. For example, multiple subscriber devices may connect to a network switch, e.g., a digital subscriber line access multiplexer (DSLAM), maintained by the service provider network. Although data for the multiple subscriber devices connected to the network switch are transported over the same physical connection, each of the subscriber devices typically has a dedicated subscriber interface, e.g., an ATM virtual circuit (VC) or an Ethernet virtual local area network (VLAN), to the network device and hence the Internet.

VLANs are a generic grouping mechanism for Ethernet packets that are independent of media access control (MAC) addressing. VLANs enable the network switch to multiplex multiple protocol interfaces over a single physical Ethernet port. For example, the network switch may present both IP interfaces and Point-to-Point Protocol over Ethernet (PPPOE) interfaces on one or more VLANs. An Ethernet frame header includes a VLAN identification (VID) that identifies the VLAN associated with the Ethernet packet. The VLAN may comprise either a single tagged VLAN or a double tagged VLAN. A single tagged VID identifies the subscriber device that sent the packet to the network device. A double tagged VID identifies both the subscriber device that sent the packet and the network switch that transferred the packet from the subscriber device to the network device.

Currently, service provider networks are migrating away from ATM to Ethernet based infrastructures. However, statically building VLAN interfaces on the Ethernet interface of the network device consumes a large amount of time and resources from the network. Consequently, provisioning subscribers at the network device may become a bottleneck in the network as subscriber volume increases on the Ethernet interface. In other words, the Ethernet based infrastructure may cause delays in the network when adding or modifying new subscribers or subscriber infrastructure.

SUMMARY

In general, the invention is directed to techniques for dynamically building an Ethernet virtual local area network (VLAN) software interface within a network device. For example, the techniques allow dynamic building of a second VLAN interface over a first VLAN interface statically built over an Ethernet port configured to support dynamic VLANs in a network device. A network device, such as a router, may provide subscribers with access to the Internet or another network. The first VLAN interface may comprise a VLAN major interface that services multiple subscribers and the second VLAN interface may comprise a VLAN minor interface that services a specific subscriber. The network device may dynamically build a VLAN minor interface over a VLAN major interface for each subscriber connected to the network device. In this way, the techniques described herein may simplify and automate the provisioning of subscribers at the network device in order to increase the rate at which new subscribers or subscriber infrastructure can be added. The techniques may also increase the rate at which modification to existing subscribers or subscriber infrastructure can be achieved.

An Ethernet port of a network device may receive a plurality of Ethernet packets from subscriber devices within customer networks connected to the network device via Ethernet switches. An interface controller within the network device automatically determines one or more subscribers associated with the received packets and configures the existing VLAN major interface to dynamically build a VLAN minor interface for each of the subscribers. Once the VLAN minor interface is built for each of the subscribers, the interface controller may automatically sense one or more protocols of the packets received on the Ethernet port associated with the VLAN minor interface, such as the Internet Protocol (IP) and the Point-to-Point Protocol over Ethernet (PPPoE). The interface controller then dynamically builds interface columns over the VLAN minor interface for each of the sensed protocols.

After dynamically building the interface columns, the network device may authenticate a user associated with the plurality of packets received by the network device based on login information within the packets. The network device may then apply licensing agreements and Quality of Service (QoS) profiles to the user. Once the user associated with an interface column has logged out of the network device, the interface controller may tear down the interface column while persistently maintaining the corresponding VLAN minor interface.

In one embodiment, a method comprises receiving a plurality of packets on an Ethernet port of a network device, wherein a first VLAN interface is statically built over the Ethernet port. The method further comprises automatically determining one or more subscribers associated with the plurality of packets and dynamically building within the network device a second VLAN interface over the first VLAN interface for each of the one or more subscribers sensed from the plurality of packets.

In another embodiment, a computer-readable medium comprises instructions that cause a programmable processor to receive a plurality of packets on an Ethernet port of a network device, wherein a first VLAN interface is statically built over the Ethernet port. The medium further comprises instructions that cause the programmable processor to automatically determine one or more subscribers associated with the plurality of packets, and dynamically build within the network device a second VLAN interface over the first VLAN interface for each of the one or more subscribers sensed from the plurality of packets.

In a further embodiment, a network device comprises an interface element that includes an interface controller and an Ethernet port, and a forwarding controller that receives a plurality of packets from the Ethernet port and forwards the received packets to the interface controller, wherein a first VLAN interface is statically built over the Ethernet port. The network device further comprises an auto-sense module included in the interface controller that automatically senses one or more subscribers associated with the plurality of packets, and a dynamic configuration manager (DCM) included in the interface controller that dynamically builds within the network device a second VLAN interface over the first VLAN interface for each of the one or more subscribers sensed from the plurality of packets.

In another embodiment, a method comprises receiving with a network device a plurality of IP packets on a layer two (L2) interface of the network device, and dynamically building within the network device an IP interface column over the L2 interface for the plurality of IP packets. The method further comprises authenticating a user associated with the plurality of IP packets based on login information associated with the IP packets, and automatically tearing down the IP interface column when the user logs out of the network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
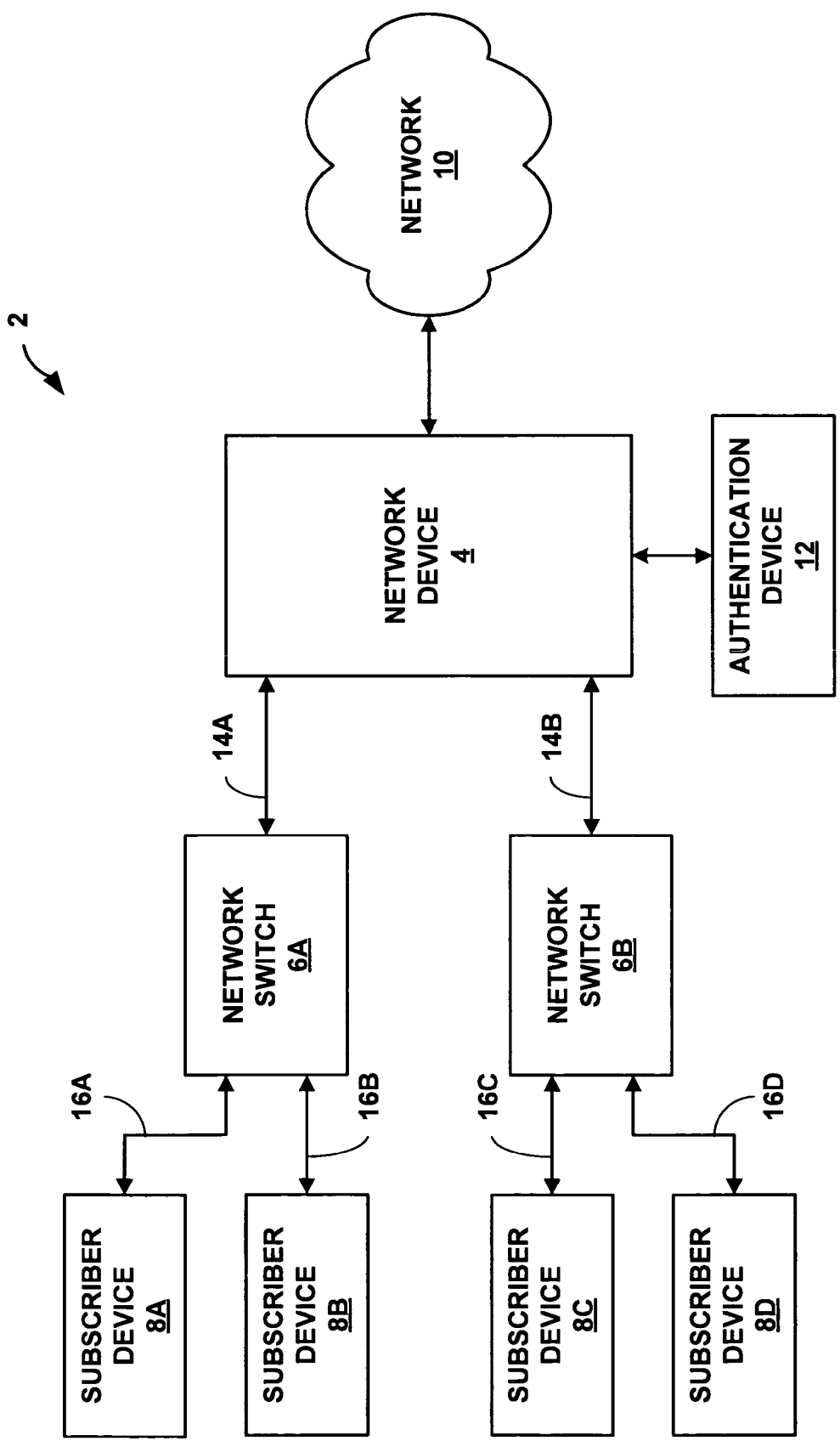
FIG. 1 is a block diagram illustrating an exemplary system in which a network device provides subscriber devices with connectivity to a network.

FIG. 1 is a block diagram illustrating an exemplary system 2 in which a network device 4 provides subscriber devices 8A-8D ("subscriber devices 8") with connectivity to a network 10. System 2 comprises an Ethernet infrastructure. In other embodiments, system 2 may comprise another layer 2 protocol infrastructure, such as an Asynchronous Transfer Mode (ATM) infrastructure. Subscriber devices 8 connect to network device 4 via network switches 6A and 6B ("network switches 6"). Network switches 6 transfer Ethernet packets received from subscriber device 8 to network device 4 over Ethernet virtual local area networks (VLANs).

In the illustrated example embodiment, the invention provides techniques for dynamically building an Ethernet VLAN interface in network device 4. For example, the Ethernet VLAN interface may comprise one of a Fast Ethernet interface, a Gigabit Ethernet interface, a 10-Gigabit Ethernet interface or any other type of Ethernet network interface. The techniques described herein may simplify and automate the provisioning of subscribers at network device 4 (i.e., the configuration of software interfaces within network device 4) in order to increase the rate at which new subscribers or subscriber infrastructure can be added. The techniques may also increase the rate at which modification to existing subscribers or subscriber infrastructure can be achieved.

In general, the term "interface" is used herein to refer to a software interface that is created or otherwise instantiated within a network device to support network communications. The term "interface column" refers to a layered representation of multiple software interfaces that may be viewed as a stack or a column of interfaces. Network data propagates up or down the interfaces of the interface column, and each interface typically corresponds with a different network communication protocol or format. In general, the software interfaces of the interface stack created by the network device correspond with one or more layers of the seven layer Open System Interconnection (OSI) networking model.

Network 10 represents any computer network and may have a variety of networked resources capable of data communication. For example, network 10 may include routers, hubs, gateways, servers, workstations, network printers and faxes or other devices. Network 10 may comprise an Internet Protocol (IP) network that includes both an IP version four (IPv4) portion and an IP version six (IPv6) portion. Moreover, network 10 may be the Internet or any public or private network.

Subscriber devices 8 may comprise personal computers, laptops, workstations, personal digital assistants (PDAs), wireless devices, network-ready appliances, file servers, print servers or other devices. In some cases, subscriber devices 8 may be included within one or more customer networks. For example, subscriber devices 8A and 8B may be included in one customer network and subscriber devices 8C and 8D may be included in another customer network. Customer networks represent networks established by individuals or companies for internal communication. Customer networks may include local area networks (LANs) or wide area networks (WANs)

that comprise a plurality of subscriber devices. In some embodiments, customer networks may be customer-specific networks that use the Ethernet protocol, or another layer 2 protocol, to communicate information in fixed or variable-sized units referred to as frames.

In the illustrated example, subscriber devices 8A and 8B connect to network device 4 via network switch 6A, and subscriber devices 8C and 8D connect to network device 4 via network switch 6B. In other embodiments, any number of network switches 6 may connect to network device 4 and any number of subscriber devices 8 may connect to each of the network switches. In one embodiment, network switches 6 may comprise digital subscriber line access multiplexers (DSLAMs) or other switch devices. Each of subscriber devices 8 may utilize the Point-to-Point protocol (PPP) 16 to communicate with network switches 6. For example, using PPP 16, one of subscriber devices 8 requests access to network 10 and provides login information, such as a username and password. PPP 16 may be supported on digital subscriber lines (DSLs) that connect subscriber devices 8 with network switches 6. In other embodiments, subscriber devices 8 may utilize a non-PPP protocol to communicate with network switches 6.

Each of network switches 6 may communicate with network device 4 over a physical Ethernet interface supporting the Ethernet protocol 14. A Broadband Remote Access Server (BRAS) application may aggregate output from switches 6 into a higher-speed uplink to network device 4. Network device 4 may be configured to support the BRAS application. Although data for subscriber devices 8 are transported from each of network switches 6 to network device 4 over the same physical connection, each of subscriber devices 8 may have a dedicated Ethernet port to communicate Ethernet frames to network device 4 and hence to network 10. In some embodiments, network device 4 may comprise a router that maintains routing information between subscriber devices 8 and network 10.

Virtual local area networks (VLANs) are a generic grouping mechanism for Ethernet packets that are independent of media access control (MAC) addressing. VLANs enable each of network switches 6 to multiplex multiple protocol interfaces over a single physical Ethernet port. For example, network switch 6A may transmit both IP interfaces and Point-to-Point Protocol over Ethernet (PPPOE) interfaces on one or more VLANs. An Ethernet frame header, described in more detail below, includes a VLAN identification (VID) that identifies the subscriber associated with the Ethernet packet.

The dynamic configuration techniques described herein allow network device 4 to dynamically build a second VLAN interface over a first VLAN interface statically built over an Ethernet port of network 4 configured to support dynamic VLANs in network device 4. The first VLAN interface may comprise a VLAN major interface and the second VLAN interface may comprise a VLAN minor interface. In general, the term "VLAN major interface" refers to a first VLAN interface capable of servicing multiple subscribers. In contrast, the term "VLAN minor interface" refers to a second VLAN interface associated with a specific subscriber. Multiple VLAN minor interfaces may be built on top of a single VLAN major interface to carry higher-level protocols. Therefore, network device 4 may dynamically build a VLAN minor interface over a VLAN major interface for each subscriber connected to network device 4.

Network device 4 may automatically determine one or more subscribers associated with Ethernet packets received on the Ethernet port over which the VLAN major interface is statically built. Network device 4 then dynamically creates a VLAN minor interface over the existing static VLAN major interface for each of the subscribers determined from the received packets. As a result, network device 4 may dynamically create multiple VLAN minor interfaces over the same VLAN major interface statically built over the Ethernet port. In this way, the techniques may substantially eliminate a subscriber provisioning bottleneck by dynamically configuring a VLAN minor interface for each subscriber connected to network device 4.

Once the VLAN minor interface is built for each of the subscribers, network device 4 may automatically sense one or more protocols of the packets received on the Ethernet port associated with the VLAN minor interface, such as IP and PPPoE. Network device 4 then dynamically builds subscriber-specific interface columns over the VLAN minor interface for each of the sensed protocols.

After dynamically building the interface columns, network device 4 may authenticate users based on login information received from subscriber devices 8. In the illustrated embodiment, network system 2 includes an authentication device 12, such as a Remote Authentication Dial-In User Server (RADIUS). Network device 4 forwards the login information to authentication device 12. Authentication device 12 authenticates the login information and provides the authentication to network device 4. In other embodiments, network device 4 may internally authenticate the login information. Network device 4 may then take certain actions, such as application of licensing agreements and Quality of Service (QoS) profiles to the users.

After authentication, the plurality of packets received on the VLAN minor interface may be processed with the corresponding interface column. Once the user associated with an interface column has logged out, network device 4 may tear down the respective interface column while persistently maintaining the corresponding VLAN minor interface. Contrary to conventional techniques, the techniques described herein enable network device 4 to tear down both PPPoE and IP interface columns when not in use. In other embodiments, the techniques may be applied to enable tear down of IP interface columns dynamically built over layer two (L2) protocols, such as ATM. In this way, the techniques may preserve network resources by only maintaining currently active interface columns associated with subscribers logged into network device 4.

Figure 2B:
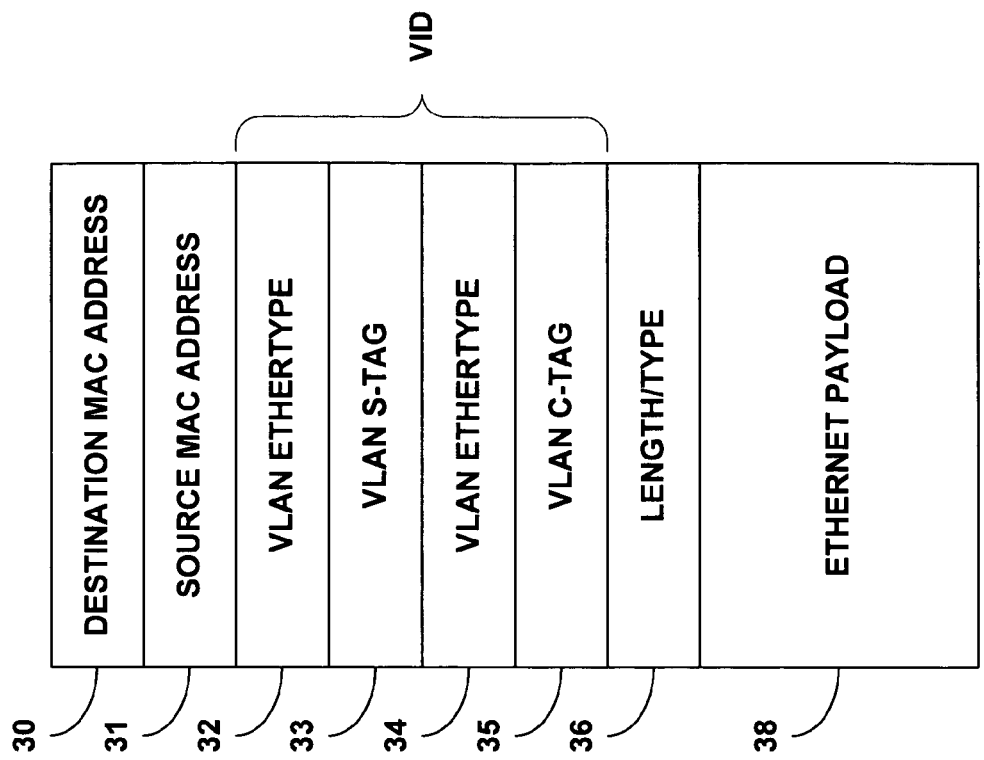
FIG. 2B is a diagram illustrating an exemplary Ethernet frame format for an Ethernet packet of a double tagged VLAN.
Figure 2A:
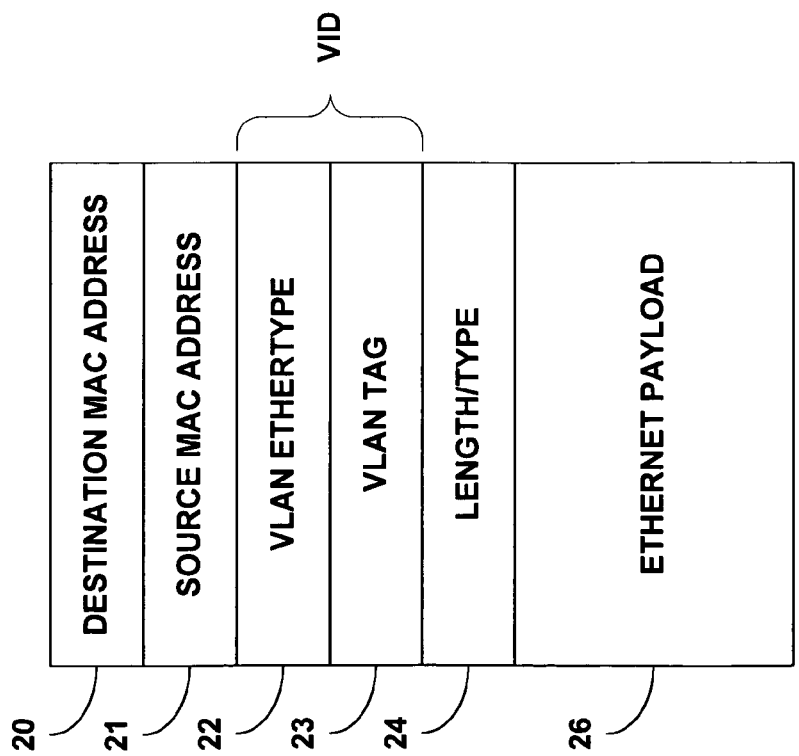
FIG. 2A is a diagram illustrating an exemplary Ethernet frame format for an Ethernet packet of a single tagged VLAN.

FIG. 2A is a diagram illustrating an exemplary Ethernet frame format for an Ethernet packet of a single tagged VLAN. The Ethernet frame format includes an Ethernet header and an Ethernet payload 26 that includes data from one of subscriber devices 8, for example. The Ethernet header includes a destination MAC address field 20, a source MAC address field 21, a VLAN Ethertype field 22, a VLAN tag field 23 and a length/type field 24. Destination MAC address field 20 and source MAC address field 21 specify endpoints for the Ethernet packet.

A single physical Ethernet interface may include a plurality of VLANs such that multiple protocol interfaces (e.g., IP interfaces and PPPoE interfaces) may be multiplexed over the physical Ethernet interface. Each of the plurality of VLANs may be configured to carry a single protocol type or multiple protocol types. VLAN Ethertype field 22 and VLAN tag field 23 form a single tagged VID for the Ethernet packet. VLAN Ethertype field 22 defines the type of Ethernet packet. VLAN tag field 23 identifies the one of subscriber devices 8 that sent the Ethernet packet. In this way, network device 4 may dynamically build a VLAN minor interface based on the VID sensed from VLAN Ethertype field 22 and VLAN tag field 23 of the Ethernet frame format.

Length/type field 24 identifies the protocol of the Ethernet packet. For example, length/type field 24 may identify one of IP or PPPoE. After dynamically building the VLAN minor interface specified by the VID, network device 4 may dynamically build an interface column over the VLAN minor interface based on the protocol specified in length/type field 24 of the Ethernet frame format.

FIG. 2B is a diagram illustrating an exemplary Ethernet frame format for an Ethernet packet of a double tagged VLAN. VLANs are a generic grouping mechanism for Ethernet packets that are independent of MAC addressing. The Ethernet frame format includes an Ethernet header and an Ethernet payload 38 that includes data from one of subscriber devices 8, for example. The Ethernet header includes a destination MAC address field 30, a source MAC address field 31, a VLAN Ethertype field 32, a VLAN S-tag field 33, a VLAN Ethertype field 34, a VLAN C-tag field 35, and a length/type field 36. Destination MAC address field 30 and source MAC address field 31 specify endpoints for the Ethernet packet.

A single physical Ethernet interface may include a plurality of VLANs such that multiple protocol interfaces (e.g., IP interfaces and PPPoE interfaces) may be multiplexed over the physical Ethernet interface. Each of the plurality of VLANs may be configured to carry a single protocol type or multiple protocol types. VLAN Ethertype field 32, VLAN S-tag field 33, VLAN Ethertype 34, and VLAN C-tag 35 field form a double tagged VID for the Ethernet packet. VLAN Ethertype field 32 defines a configurable Ethertype. VLAN S-tag field 33 identifies the one of network switches 6 that transferred the Ethernet packet from one of subscriber devices 8 to network switch 4. VLAN Ethertype field 34 defines the type of Ethernet packet. VLAN C-tag field 35 identifies the one of subscriber devices 8 that sent the Ethernet packet to the one of network switches 6 identified by VLAN S-tag field 33. In this way, network device 4 may dynamically build a VLAN minor interface based on the VID sensed from VLAN Ethertype field 32, VLAN S-tag field 33, VLAN Ethertype field 34, and VLAN C-tag field 35 of the Ethernet frame format.

Length/type field 36 identifies the protocol of the Ethernet packet. For example, length/type field 36 may identify one of IP or PPPoE. After dynamically building the VLAN minor interface specified by the VID, network device 4 may dynamically build an interface column over the VLAN minor interface based on the protocol specified in length/type field 36 of the Ethernet frame format.

Figure 3:
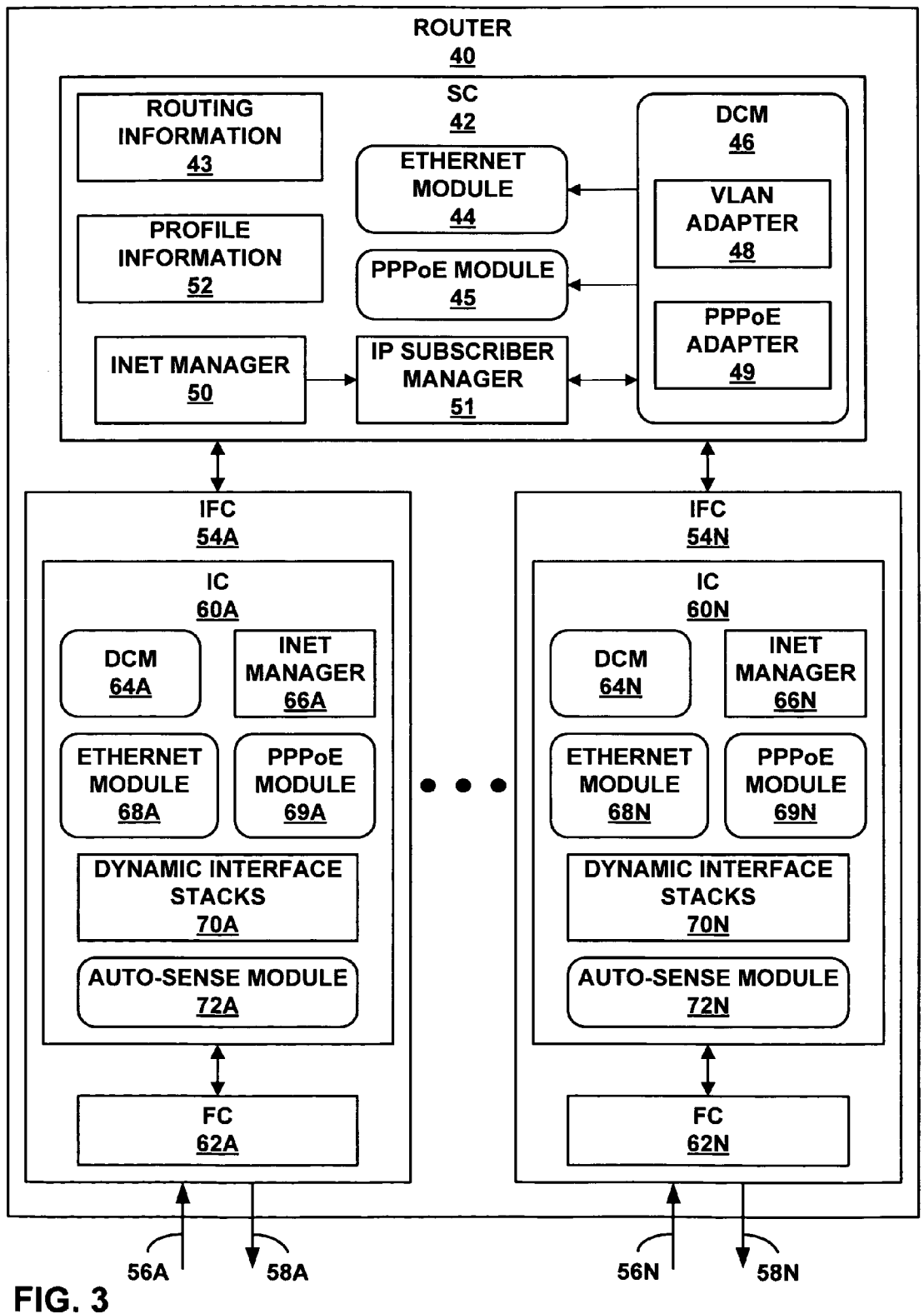
FIG. 3 is a block diagram illustrating an exemplary embodiment of a router.

FIG. 3 is a block diagram illustrating an exemplary embodiment of a router 40. Router 40 may operate substantially similar to network device 4 (FIG. 1). Router 40 is capable of dynamically configuring a VLAN interface consistent with the principles of the invention. Router 40 automatically determines a subscriber associated with a received Ethernet packet and dynamically builds a VLAN minor interface over a statically configured VLAN major interface for the subscriber. Router 40 may then auto-sense one or more protocols associated with the received packet and dynamically build an interface stack over the VLAN minor interface.

In the illustrated embodiment, router 40 includes a system controller (SC) 42 that maintains routing information 43 to reflect the current topology of a network, e.g., network 10 of FIG. 1, and other network entities to which router 40 is connected. SC 42 also maintains profile information 52 that may be applied to the static VLAN major interface. Profile information 52 instructs the VLAN major interface to dynamically configure VLAN minor interfaces and protocol interface columns.

SC 42 includes a dynamic configuration manager (DCM) 46 that maintains dynamic configuration information to reflect the current VLAN minor interfaces built for each Ethernet subscriber connected to router 40. DCM 46 may also maintain information to reflect the current protocol, e.g., PPPoE or IP, interface columns built for each protocol type of packets received on the VLAN minor interfaces. Furthermore, SC 42 includes an Ethernet module 44, a PPPoE module 45, a VLAN adapter 48, a PPPoE adapter 49, an Inet manager 50, and an IP subscriber manager 51. In the illustrated embodiment, VLAN adapter 48 and PPPoE adapter 49 are included within DCM 46. In other embodiments, VLAN adapter 48 and PPPoE adapter 49 may comprise individual components coupled to DCM 46.

Router 40 also includes interface cards (IFCs) 54A-54N ("IFCs 54") that receive packets on inbound links 56A-56N ("inbound links 56") and send packets on outbound links 58A-58N ("outbound links 58"). IFCs 54 are coupled to SC 42. Typically, IFCs 54 are coupled to SC 42 via a high-speed switch (not shown). Each of IFCs 54 includes an interface controller (IC), and a forwarding controller (FC). When FCs 62 receive control plane packets from subscribers, for example subscriber devices 8 of FIG. 1, on inbound links 56, FCs 62 send the control plane packets to ICs 60. In other embodiments, interface controllers and forwarding controllers may be located in other components of router 40 (e.g., SC 42) and not located within IFCs.

ICs 60 include DCMs 64, Inet managers 66, Ethernet modules 68, PPPoE module 69, dynamic interface stacks 70, and auto-sense modules 72. Auto-sense modules 72 are capable of automatically sensing VIDs and protocols of Ethernet packets received by FCs 62. Dynamic interface stacks 70 dictate which packet protocols are currently supported on the corresponding Ethernet VLANs. A system administrator statically builds a VLAN major interface over each Ethernet port included on FCs 62. The system administrator statically configures the VLAN major interface to enable automatic sensing of VLAN encapsulated packets. The system administrator also assigns a profile to the VLAN major interface. The profile may be included within profile information 52 maintained by SC 42. The profile enables the configuration of dynamic VLAN minor interfaces over the VLAN major interface. In addition, the profile may comprise attributes that specify a type of interface column to be dynamically built over the VLAN minor interface.

In some cases, the system administrator may statically configure the VLAN major interface to enable automatic sensing of VLAN encapsulated packets that include VIDs within a specified range. The system administrator may also assign a profile to the VLAN major interface for the specified VID range. In this way, the system administrator may assign different profiles to different ranges of VIDs on the VLAN major interface.

In general, subscriber devices (not shown in FIG. 3) send Ethernet packets to router 40 via network switches (not shown) on Ethernet ports that can support multiple interface columns. When IC 60A, for example, receives an Ethernet packet, auto-sense module 72A senses the subscriber associated with the packet. Auto-sense module 72A automatically senses the subscriber by checking the VID within the Ethernet packet. IC 60A then uses dynamic interface stacks 70A to determine whether a VLAN minor interface already exists for the VID of the received packet.

In the case where the VLAN minor interface does not exist in interface stacks 70A, IC 60A may dynamically build a VLAN minor interface over the static VLAN major interface based on the VID automatically sensed from the received Ethernet packet by auto-sense module 72. More specifically, IC 60A requests DCM 64A to create a VLAN minor interface based on the VID of the received packet. Upon receiving the VLAN minor interface creation request, DCM 64A forwards the request to DCM 46 in SC 42.

DCM 46 instantiates the profile assigned to the VLAN major interface from profile information 52. VLAN adapter 48 within DCM 46 then creates the requested VLAN minor interface based on information received from DCM 64A in IC 60A. VLAN adapter 48 sends a message to Ethernet module 44 of SC 42 to update Ethernet module 44 with the new VLAN minor interface. Ethernet module 44 of SC 42 forwards the message to Ethernet module 68A of IC 60A. In this way, DCM 64A of IC 60A dynamically builds the VLAN minor interface over the static VLAN major interface in dynamic interface stacks 70A.

Once the VLAN minor interface for the VID of the received Ethernet packet is built over the static VLAN major interface, ICs 60A may dynamically build an interface column over the VLAN minor interface based on the protocol automatically sensed from the received Ethernet packet by auto-sense module 72A. Auto-sense module 72A automatically senses the protocol associated with the Ethernet packet by checking the length/type field within the Ethernet packet. For example, auto-sense module 72 may sense that the received packet comprises one of an IP or PPPoE packet. In some cases, the VLAN minor interface may be configured to support bifurcated interface columns. In other words, the VLAN minor interface may support both an IP interface column and a PPPoE interface column.

In the case of a PPPoE packet, IC 60A requests DCM 64A to create a PPPoE major interface layer based on the sensed protocol of the received packet. Upon receiving the PPPoE major interface layer creation request, DCM 64A forwards the request to DCM 46 in 42. DCM 46 instantiates the profile assigned to the VLAN major interface from profile information 52. PPPoE adapter 49 within DCM 46 then creates the requested PPPoE major interface layer based on information received from DCM 64A in IC 60A. PPPoE adapter 49 sends a message to PPPoE module 45 of SC 42 to update PPPoE module 45 with the new PPPoE major interface layer. PPPoE module 45 of SC 42 forwards the message to PPPoE module 69A of IC 60A. In this way, DCM 64A of IC 60A dynamically builds the PPPoE major interface layer over the VLAN minor interface in dynamic interface stacks 70A.

Once the PPPoE major interface layer is created, IC 60A requests DCM 64A to create a PPPoE minor interface. DCM 64A may dynamically build the PPPoE minor interface layer over the PPPoE major interface layer within dynamic interface column 70A in a substantially similar manner as described above. IC 60A then requests DCM 64A to create a PPP interface layer over the PPPoE minor interface layer. Finally, IC 60A request DCM 64A to create an IP interface layer over the PPP interface layer to complete the interface column. DCM 46 of SC 42 may apply additional profiles within profile information 52 to the IP interface created over the PPPoE interface column. In some cases, the IP interface layer may comprise one of an IPv4 interface layer or an IPv6 interface layer.

In the case of an IP packet, IC 60A requests Inet manager 66A to create an IP interface layer based on the sensed protocol of the received packet. Upon receiving the IP interface layer creation request, Inet manager 66A forwards the request to Inet manager 50 in 42. The request is then sent to DCM 46 within SC 42 via IP subscriber manager 51. DCM 46 instantiates the profile assigned to the VLAN major interface from profile information 52. DCM 46 may apply additional profiles within profile information 52 to the IP interface created over the VLAN interface. These profiles may be different than profiles applied to an IP interface created over a PPPoE interface column. IP subscriber manager 51 then creates the requested IP interface layer based on information received from Inet manager 66A in IC 60A.

Inet manager 50 of SC 42 then forwards a message regarding the new IP interface layer to Inet manager 66A of IC 60A. In this way, Inet manager 66A of IC 60A dynamically builds the IP interface layer over the VLAN minor interface in dynamic interface stacks 70A. Inet manager 66A of IC 60A and Inet manager 50 of SC 42 allow the IP interface column to be created without building IP subscriber interfaces for each subscriber associated with the IP interface column. In some cases, the IP interface layer may comprise one of an IPv4 interface layer or an IPv6 interface layer.

After dynamically building the interface columns, router 40 may authenticate users based on login information received from the corresponding subscriber devices. In some cases, router 40 may internally authenticate the login information. In other cases, router 40 may forward the login information to an authentication device (e.g., a RADIUS), which authenticates the login information and provides the authentication to router 40. Router 40 may then apply licensing agreements and Quality of Service (QoS) profiles to the users.

FC 62A may pass the Ethernet packet from an authenticated user up the corresponding dynamically configured interface column. IC 60A then passes the Ethernet packet to SC 42. SC 42 may update routing information 43 based on control information within the Ethernet packet. SC 42 may acknowledge receipt of the Ethernet packet by sending acknowledgement messages to the corresponding subscriber devices via FCs 62 and outbound links 58.

Once the user associated with a particular interface column has logged out, router 40 may tear down the interface column while persistently maintaining the corresponding VLAN minor interface. For example, IC 60A may tear down a PPPoE interface column once the user associated with the PPPoE interface column and the corresponding VLAN has logged out of router 40. In addition, IC 60A may tear down an IP interface column once the user associated with the IP interface column and the corresponding VLAN has logged out of router 40. The techniques described herein use Inet managers instead of DCMs to dynamically build IP interface columns directly over a VLAN interface. In this way, the techniques allow an IP interface column to be created without building IP subscriber interfaces for each subscriber associated with the IP interface column.

Figure 4:
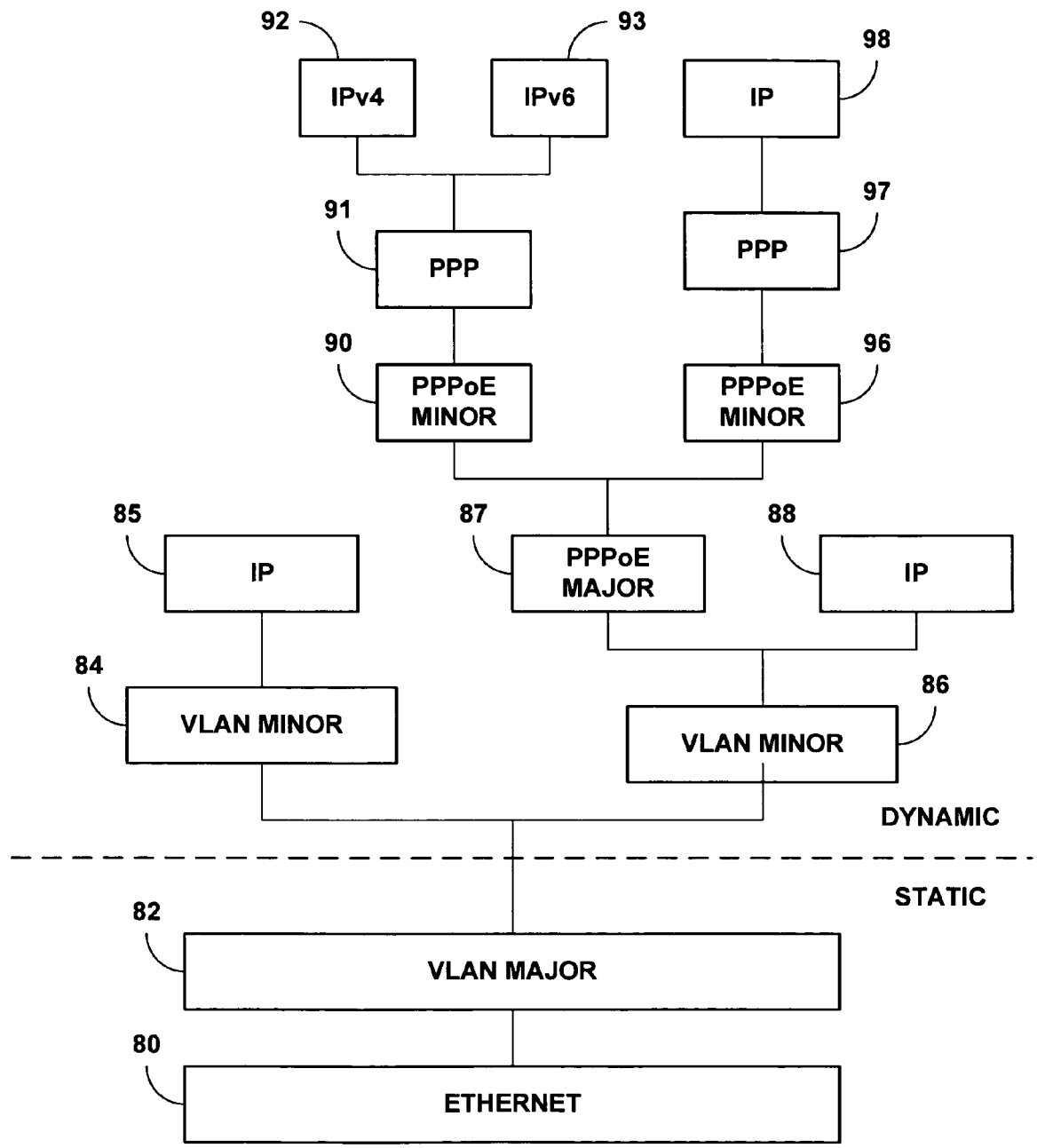
FIG. 4 is a block diagram illustrating an exemplary embodiment of a dynamic interface stack built on a VLAN interface, in accordance with an embodiment of the invention.

FIG. 4 is a block diagram illustrating an exemplary embodiment of a dynamic interface stack built over a static VLAN major interface, in accordance with an embodiment of the invention. The illustrated dynamic interface stack may be substantially similar to any of dynamic interface stacks 70 utilized by router 40 of FIG. 3. The dynamic interface stack includes an Ethernet port 80 and a VLAN major interface 82 statically created by a system administrator.

In this example, Ethernet port 80 may comprise a Fast Ethernet interface, a Gigabit Ethernet interface, or a 10-Gigabit Ethernet interface or any other type of Ethernet network interface. VLAN major interface 82 may be statically configured to enable automatic sensing of VLAN encapsulated packets. The system administrator also assigns a profile to VLAN major interface 80 that enables the configuration of dynamic VLAN minor interfaces over the VLAN major interface. In addition, the profile may comprise attributes that specify a type of interface column to be dynamically built over the VLAN minor interface.

One of FCs 62 of router 40 (e.g., FC 62A) receives a first Ethernet packet on the Ethernet port over which VLAN major interface 82 is statically built. FC 62A passes the first Ethernet packet to IC 62A, which dynamically builds a first VLAN minor interface 84 based on the automatically sensed VID associated with the first Ethernet packet. The VID identifies the subscriber that sent the first Ethernet packet to router 40. FC 62A then receives a second Ethernet packet on the same Ethernet port that includes a VID different than the VID associated with the first Ethernet packet. IC 60A dynamically builds a second VLAN minor interface 86 based on the automatically sensed VID associated with the second Ethernet packet. In other embodiments, static VLAN major interface 81 may support one or more dynamically built VLAN minor interfaces as well as one or more statically built VLAN minor interfaces.

Interface columns may be dynamically built over each of VLAN minor interfaces 84 and 86 based on the automatically sensed protocol type associated with the received Ethernet packet. In the illustrated embodiment, IC 60A senses that the first Ethernet packet comprises an IP packet and dynamically builds an IP interface 85 over first VLAN minor interface 84.

IC 60A also senses that the second Ethernet packet comprises a PPPoE packet and dynamically builds a PPPoE interface column over the second VLAN minor interface 86. The PPPoE interface column includes a PPPoE major layer 87 capable of supporting multiple PPPoE minor interface layers. FC 62A may later receive other Ethernet packets that include the VID of second VLAN minor interface 86 such that IC 60A may build multiple PPPoE minor interface columns over PPPoE major interface 87. As illustrated, PPPoE major interface 87 supports a first PPPoE minor interface layer 90 with a first PPP interface layer 91 and both an IPv4 interface layer 92 and an IPv6 interface layer 93. PPPoE major interface 87 also supports a second PPPoE minor interface layer 96 with a second PPP interface layer 97 and an IP interface layer 98.

In addition, FC 62A receives a third Ethernet packet that includes the VID of second VLAN minor interface 86. However, IC 60A senses that the third Ethernet packet comprises an IP packet. In this case, second VLAN minor interface 86 may be bifurcated to support both a PPPoE interface column and an IP interface column. In the illustrated embodiment, IC 60A dynamically builds an IP interface 88 over second VLAN minor interface 86 along with PPPoE major interface 87.

Figure 5:
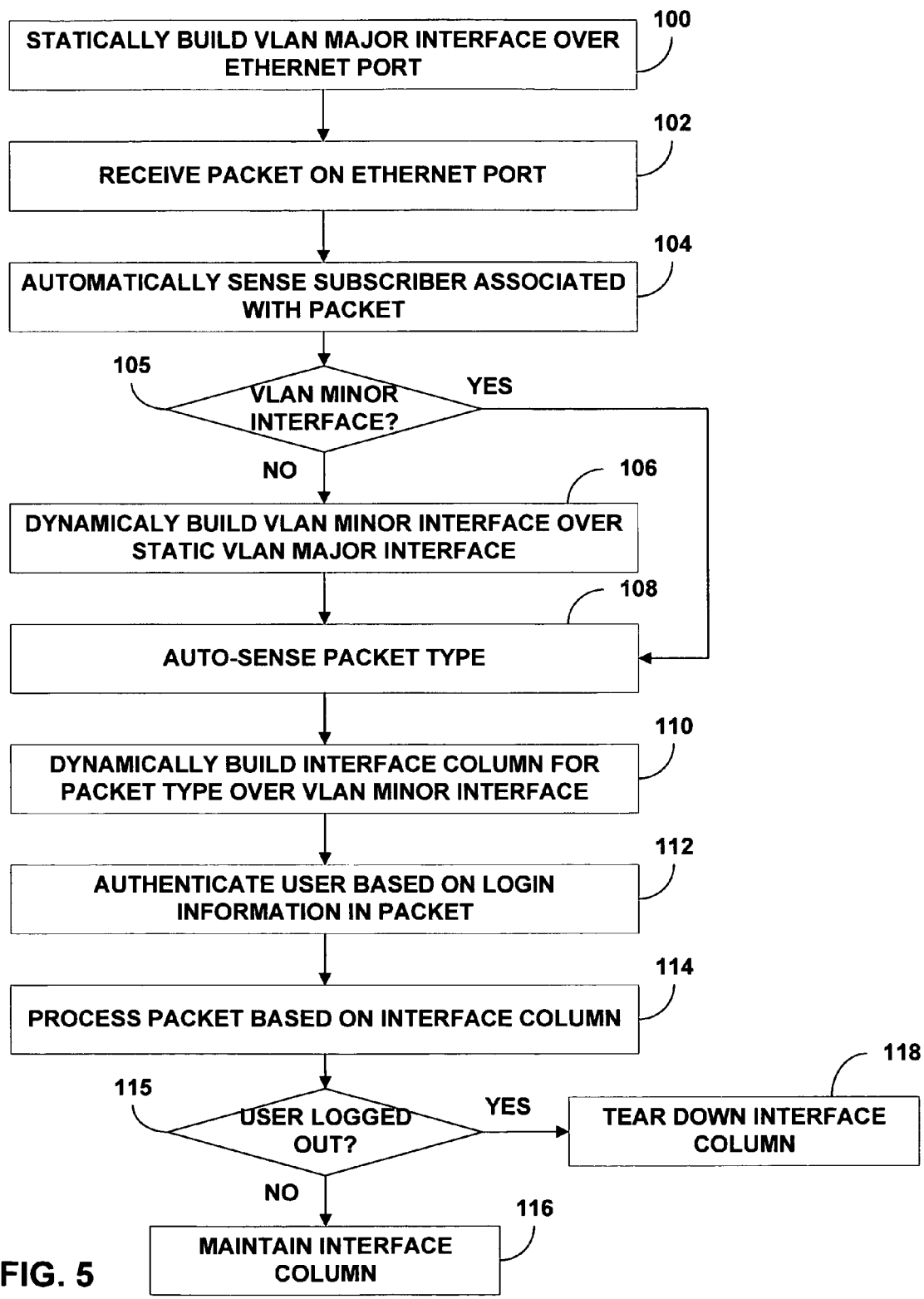
FIG. 5 is a flowchart illustrating an exemplary method for dynamically building a VLAN minor interface and a protocol interface column.

FIG. 5 is a flowchart illustrating an exemplary method for dynamically building a VLAN minor interface and a protocol interface column. For exemplary purposes, the method will be described herein in reference to router 40 of FIG. 3. Initially, a system administrator or an automated software agent configures router 40 to statically build a VLAN major interface over each Ethernet port included on FCs 62 of router 40 (100). The system administrator configures the VLAN major interface to enable automatic sensing of VLAN encapsulated packets. The system administrator also assigns a profile to the VLAN major interface to enable the configuration of dynamic VLAN minor interfaces and dynamic protocol interface columns over the VLAN major interface.

One of FCs 62, e.g., FC 62A, of router 40 receives an Ethernet packet on the Ethernet port over which VLAN major interface is statically built from a subscriber device via a network switch (102). FC 62A passes the Ethernet packet to IC 60A. Auto-sense module 72A then automatically senses the subscriber associated with the packet (104). Auto-sense module 72A automatically senses the subscriber by checking the VID within the Ethernet packet. IC 60A then uses dynamic interface stacks 70A to determine whether a VLAN minor interface already exists for the VID of the received packet (105).

In the case where the VLAN minor interface does not exist in interface stacks 70A (no branch of 105), IC 60A may dynamically build a VLAN minor interface over the static VLAN major interface based on the VID automatically sensed from the received Ethernet packet by auto-sense module 72 (106). Once the VLAN minor interface is built over the static VLAN major interface, or the VLAN minor interface already exists in interface stacks 70A (yes branch of 105), auto-sense module 72 automatically senses the protocol type associated with the received Ethernet packet (108). Auto-sense module 72A automatically senses the protocol associated with the Ethernet packet by checking the length/type field within the Ethernet packet. For example, auto-sense module 72 may sense that the received packet comprises one of an IP or PPPoE packet. IC 60A then dynamically builds an interface column over the VLAN minor interface based on the automatically sensed protocol (110).

After dynamically building the interface column, router 40 authenticates a user associated with the interface column based on login information included in the received Ethernet packet (112). Router 40 may also apply licensing agreements and Quality of Service (QoS) profiles to the user. IC 60A then processes the received packet on the corresponding interface column (114). If the user associated with the interface column remains logged into router 40 (no branch of 115), IC 60A maintains the interface column that is still utilized by the authenticated users (116).

Once the user associated with the interface column has logged out (yes branch of 115), IC 60A may tear down an upper portion of the interface columns while persistently maintaining a lower portion corresponding to the VLAN minor interface and any lower interfaces (118). For example, IC 60A may tear down both PPPoE interface columns and IP interface columns once the users associated with the interface columns have logged out of router 40. Contrary to conventional techniques, the techniques described herein allow IP interface columns to be created without building IP subscriber interfaces for each subscriber associated with the IP interface column. In this way, the techniques enable tear down of IP interface columns. In other embodiments, the techniques may be applied to enable tear down of IP interface columns dynamically built over other L2 protocols, such as ATM.

Figure 6:
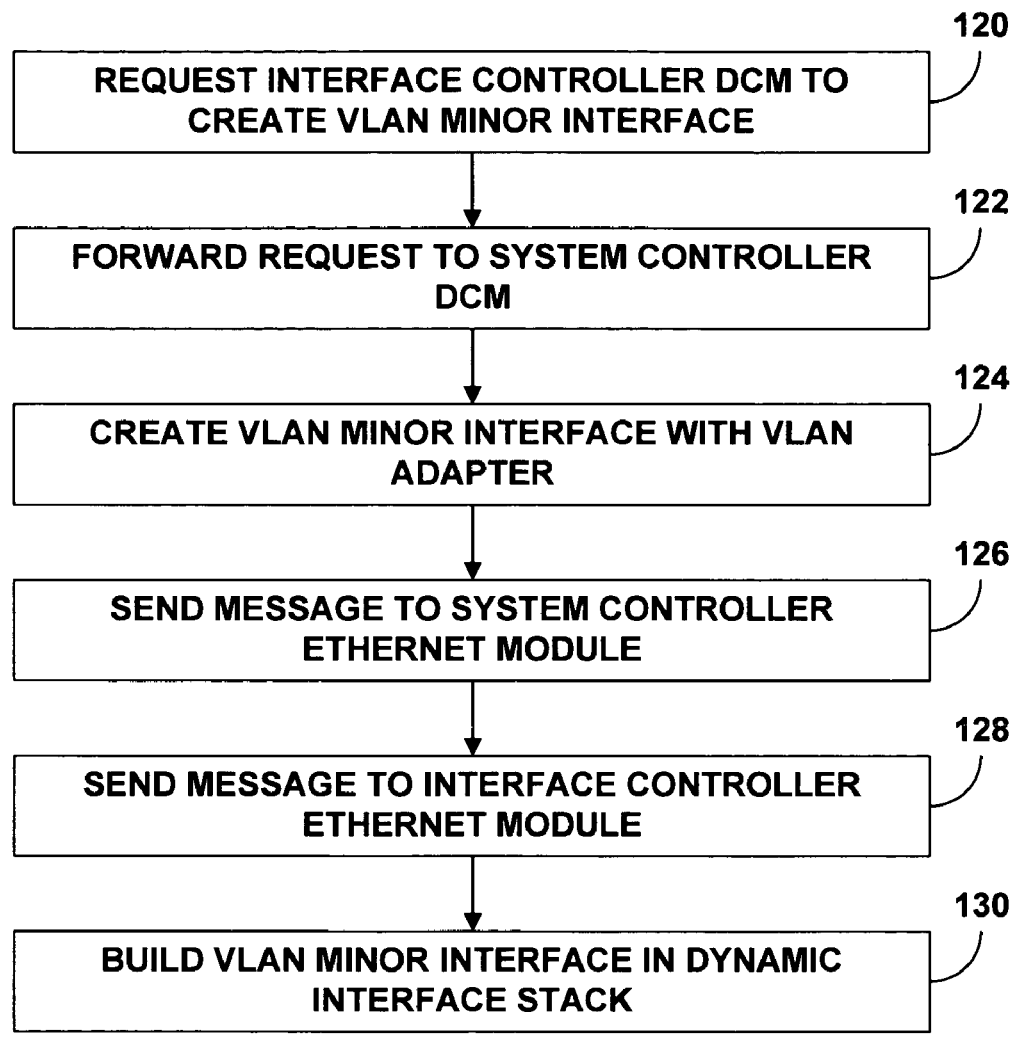
FIG. 6 is a flowchart illustrating an exemplary method for dynamically building a VLAN minor interface, in accordance with an embodiment of the invention.

FIG. 6 is a flowchart illustrating an exemplary method for dynamically building a VLAN minor interface, in accordance with an embodiment of the invention. For example, the method may describe step 106 from FIG. 5 in greater detail. For exemplary purposes, the method will be described herein in reference to router 40 of FIG. 3. Once auto-sense module 72A senses the VID associated with a received Ethernet packet, IC 60A requests DCM 64A to create a VLAN minor interface based on the VID of the received packet (120). Upon receiving the VLAN minor interface creation request, DCM 64A in IC 60A forwards the request to DCM 46 in SC 42 (122).

DCM 46 instantiates the profile assigned to the VLAN major interface from profile information 52. VLAN adapter 48 within DCM 46 then creates the requested VLAN minor interface based on information received from DCM 64A in IC 60A (124). VLAN adapter 48 sends a message to Ethernet module 44 of SC 42 to update Ethernet module 44 with the new VLAN minor interface (126). Ethernet module 44 of SC 42 forwards the message to Ethernet module 68A of IC 60A (128). In this way, Ethernet module 68A enables DCM 64A of IC 60A to dynamically build the VLAN minor interface on the static VLAN major interface in dynamic interface stacks 70A (130).

Figure 7:
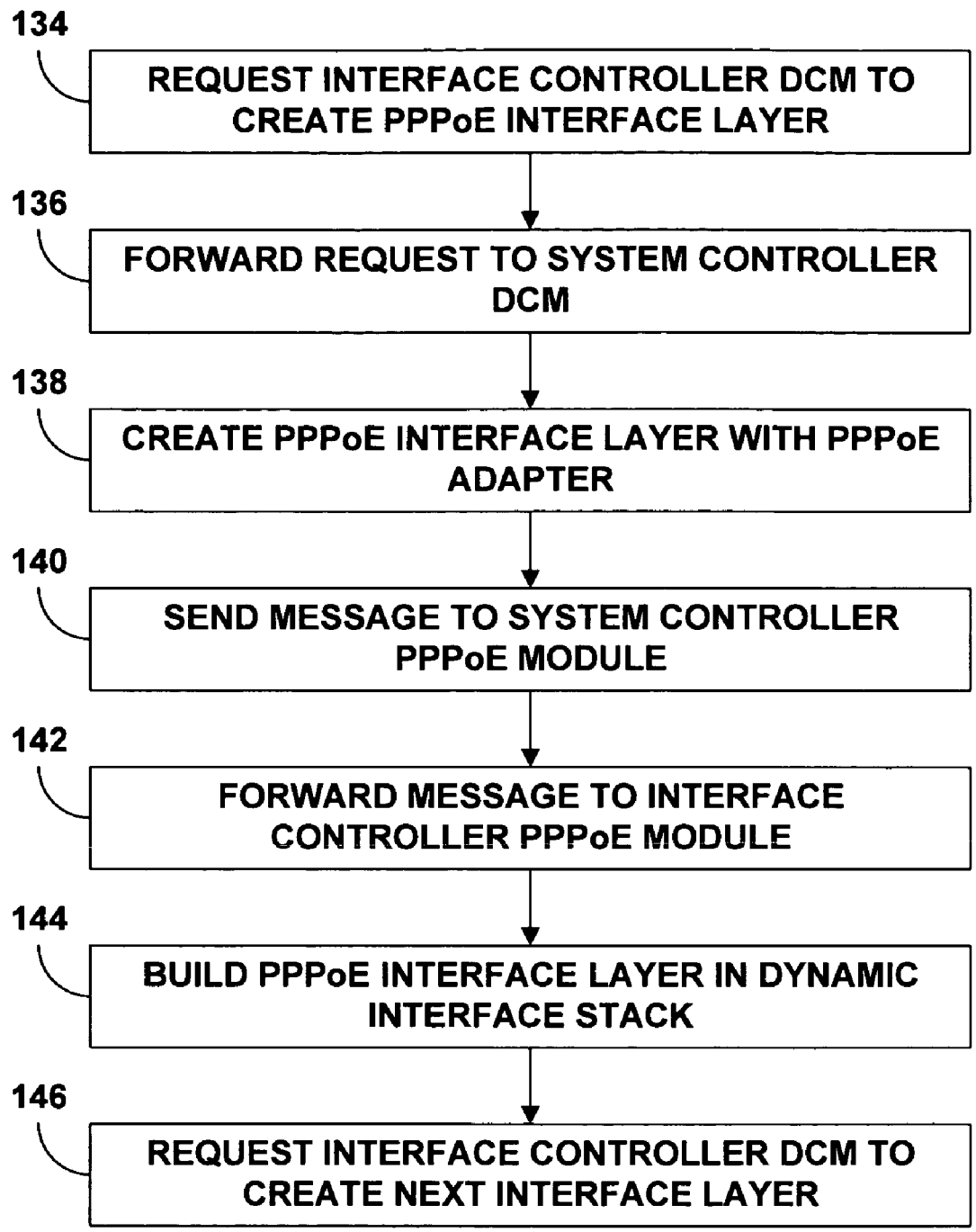
FIG. 7 is a flowchart illustrating an exemplary method for dynamically building a PPPoE interface column over a dynamic VLAN interface, in accordance with an embodiment of the invention.

FIG. 7 is a flowchart illustrating an exemplary method for dynamically building a PPPoE interface column over a dynamic VLAN interface, in accordance with an embodiment of the invention. The method may describe step 110 from FIG. 5 in greater detail. For exemplary purposes, the method will be described herein in reference to router 40 of FIG. 3.

Once auto-sense module 72A senses that the received Ethernet packet comprises a PPPoE packet, IC 60A requests DCM 64A to create a PPPoE major interface layer based on the sensed protocol of the received packet (134). Upon receiving the PPPoE major interface layer creation request, DCM 64A in IC 60A forwards the request to DCM 46 in SC 42 (136). DCM 46 instantiates the profile assigned to the VLAN major interface from profile information 52. PPPoE adapter 49 within DCM 46 then creates the requested PPPoE major interface layer based on information received from DCM 64A in IC 60A (138). PPPoE adapter 49 sends a message to PPPoE module 45 of SC 42 to update PPPoE module 45 with the new PPPoE major interface layer (140). PPPoE module 45 of SC 42 forwards the message to PPPoE module 69A of IC 60A (142). In this way, DCM 64A of IC 60A dynamically builds the PPPoE major interface layer over the VLAN minor interface in dynamic interface stacks 70A (144).

IC 60A then requests DCM 64A to create the next interface layer in the PPPoE interface column (146). In a substantially similar manner as described above, DCM 64A may dynamically build the PPPoE minor interface layer over the PPPoE major interface layer, a PPP interface layer over the PPPoE minor interface layer, and an IP interface layer over the PPP interface layer within dynamic interface column 70A to complete the interface column. DCM 46 of SC 42 may apply additional profiles within profile information 52 to the IP interface created over the PPPoE interface column. Once the PPPoE interface column is complete (i.e., no addition layer are required), FC 62A processes the Ethernet packet on the dynamic PPPoE interface column.

Figure 8:
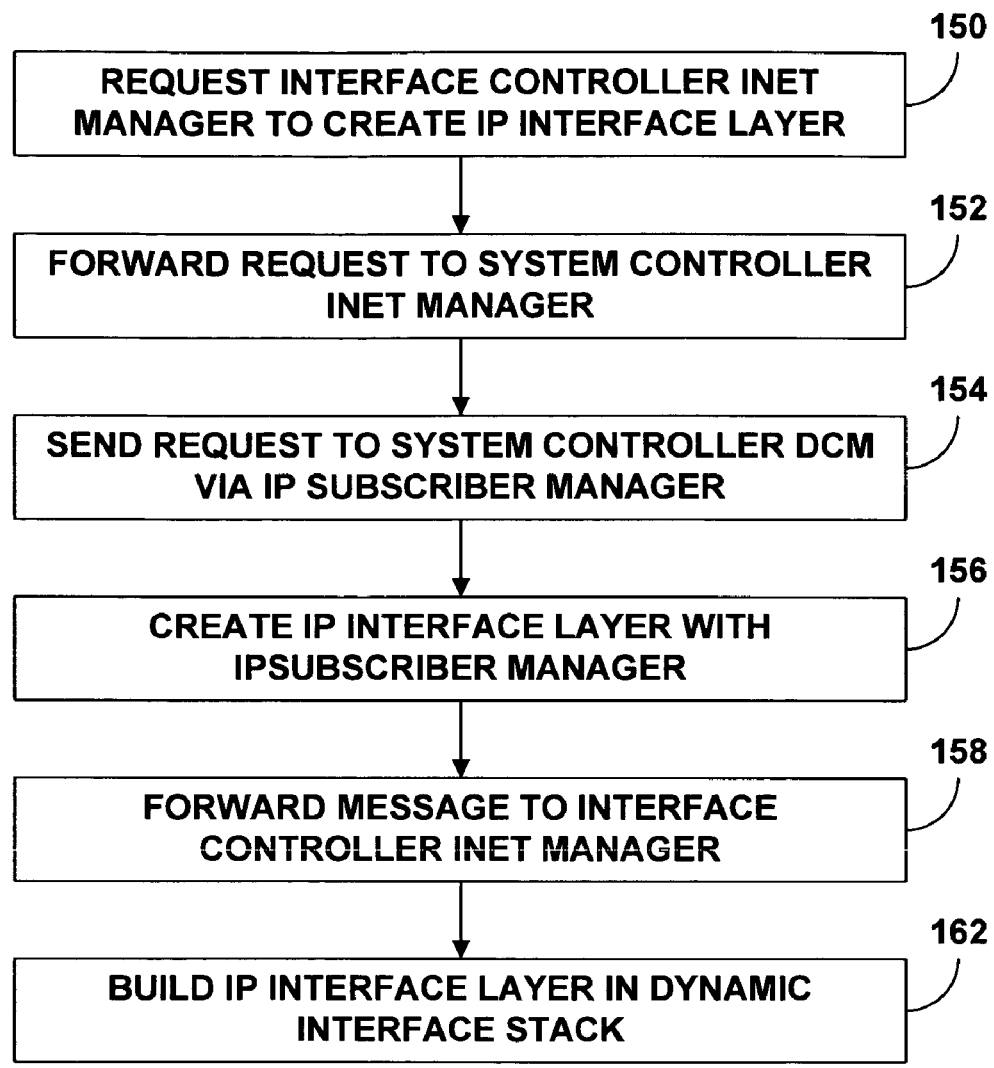
FIG. 8 is a flowchart illustrating an exemplary method for dynamically building an IP interface column over a dynamic VLAN interface, in accordance with an embodiment of the invention.

FIG. 8 is a flowchart illustrating an exemplary method for dynamically building an IP interface column over a dynamic VLAN interface, in accordance with an embodiment of the invention. The method may describe step 110 from FIG. 5 in greater detail. For exemplary purposes, the method will be described herein in reference to router 40 of FIG. 3.

Once auto-sense module 72A senses that the received Ethernet packet comprises an IP packet, IC 60A requests Inet manager 66A to create an IP interface layer based on the sensed protocol of the received packet (150). Upon receiving the IP interface layer creation request, Inet manager 66A forwards the request to Inet manager 50 in SC 42 (152). The request is then sent to DCM 46 within SC 42 via IP subscriber manager 51 (154). DCM 46 instantiates the profile assigned to the VLAN major interface from profile information 52. DCM 46 may apply additional profiles within profile information 52 to the IP interface created over the VLAN interface. These profiles may be different than profiles applied to an IP interface created over a PPPoE interface column. IP subscriber manager 51 then creates the requested IP interface layer based on information received from Inet manager 66A in IC 60A (156).

Inet manager 50 of SC 42 forwards a message regarding the new IP interface layer to Inet manager 66A of IC 60A (158). In this way, Inet manager 66A of IC 60A dynamically builds the IP interface layer over the VLAN minor interface in dynamic interface stacks 70A (162). Inet manager 66A of IC 60A and Inet manager 50 of SC 42 allow the IP interface column to be created without building IP subscriber interfaces for each subscriber associated with the IP interface column. Once the IP interface column is complete, FC 62A processes the Ethernet packet on the dynamic IP interface column.

Various embodiments of the invention have been described. For example, techniques have been described for dynamically building Ethernet VLAN minor interfaces over statically created VLAN major interface. The VLAN minor interfaces may be built based on an automatically sensed subscriber, or VID, associated with a received Ethernet packet. Dynamic interface columns may then be built over the VLAN minor interfaces based on an automatically sensed protocol type of the Ethernet packet. The techniques also enable tear down of the dynamic interface columns when not in use. Contrary to conventional techniques, both PPPoE interface columns and IP interface columns may be torn down. In this way, the techniques may preserve network resources by only maintaining currently active interface columns. The techniques may also be applied to enable tear down of IP interface columns dynamically built over other L2 protocols, such as ATM. These and other embodiments are within the scope of the following claims.

The invention claimed is:

1. A method comprising:
   receiving a plurality of packets on an Ethernet port of a network device, wherein the plurality of packets are received from one or more subscriber devices, and wherein a first virtual local area network (VLAN) interface is statically built over the Ethernet port;
   automatically determining, with the network device, one or more subscribers associated with the plurality of packets; and
   in response to receiving the plurality of packets and determining the one or more subscribers associated with the plurality of packets, dynamically building within the network device a corresponding second VLAN interface over the first VLAN interface for each of the one or more subscribers.

2. The method of claim 1, wherein the first VLAN interface comprises a VLAN major interface and the second VLAN interface comprises a VLAN minor interface.

3. The method of claim 2, wherein the VLAN major interface comprises a VLAN interface that services one or more subscribers, and the VLAN minor interface comprises a VLAN interface associated with a specific subscriber.

4. The method of claim 1, wherein the plurality of packets comprises a plurality of Ethernet packets.

5. The method of claim 1, wherein statically building the first VLAN interface comprises:
   configuring the first VLAN interface to enable automatic sensing of VLAN encapsulated packets; and
   assigning a profile to the first VLAN interface to enable dynamic configuration of second VLAN interfaces.

6. The method of claim 5, further comprising:
   configuring the first VLAN interface to enable automatic sensing of VLAN encapsulated packets that include VLAN identifications (VIDs) within a specified range; and
   assigning a profile to the first VLAN interface to enable dynamic configuration of second VLAN interfaces within the specified range of VIDs.

7. The method of claim 1, wherein automatically determining the one or more subscribers comprises checking a VLAN identification (VID) within each of the plurality of packets.

8. The method of claim 1, wherein dynamically building the second VLAN interface comprises instantiating a profile assigned to the first VLAN interface.

9. The method of claim 1, further comprising determining whether the second VLAN interface for each of the one or more subscribers already exists in a dynamic interface stack included in an interface controller of the network device.

10. The method of claim 9, further comprising:
processing each of the plurality of packets with the second VLAN interface corresponding to the subscriber of the packet when the second VLAN interface exists; and
dynamically building a second VLAN interface over the first VLAN interface for each of the one or more subscribers when the second VLAN interface does not already exist.

11. The method of claim 1, wherein dynamically building the second VLAN interface comprises:
receiving a second VLAN interface creation request with a first dynamic configuration manager (DCM) included in an interface controller of the network device;
forwarding the second VLAN interface creation request to a second DCM included in a system controller of the network device;
creating the requested second VLAN interface with a VLAN adapter coupled to the second DCM based on information from the first DCM; and
dynamically building the requested second VLAN interface over the first VLAN interface in a dynamic interface stack included in the interface controller with the first DCM based on communication with the VLAN adapter.

12. The method of claim 1, further comprising:
dynamically building the second VLAN interface associated with a first subscriber over the first VLAN interface; and
statically building another second VLAN interface associated with a second subscriber over the first VLAN interface.

13. The method of claim 1, further comprising:
automatically sensing one or more protocols of the plurality of packets; and
dynamically building an interface column over the second VLAN interface for each of the one or more protocols sensed from the plurality of packets.

14. The method of claim 3, wherein dynamically building the interface column comprises instantiating a profile assigned to the first VLAN interface.

15. The method of claim 14, wherein the profile comprises attributes that specify a type of interface column to be dynamically built over the second VLAN interface.

16. The method of claim 13, wherein dynamically building the interface column comprises:
dynamically building an Internet Protocol (IP) interface column over the second VLAN interface when the network device senses an IP packet; and
dynamically building a Point-to-Point Protocol over Ethernet (PPPoE) interface column over the second VLAN interface when the network device senses a PPPoE packet.

17. The method of claim 16, wherein dynamically building an IP interface column comprises:
receiving an IP interface layer creation request with a first Inet manager included in an interface controller of the network device;
forwarding the IP interface layer creation request to a second Inet manager included in a system controller of the network device;
creating the requested IP interface layer with an IP subscriber manager coupled to the second Inet manager based on information from the first Inet manager; and
dynamically building the requested IP interface layer in a dynamic interface stack included in the interface controller with the first Inet manager based on communication with the IP subscriber manager.

18. The method of claim 17, wherein dynamically building the IP interface column comprises building the IP interface column without creating subscriber interfaces.

19. The method of claim 16, wherein dynamically building a PPPoE interface column comprises:
receiving a PPPoE interface layer creation request with a first dynamic configuration manager (DCM) included in an interface controller of the network device;
forwarding the PPPoE interface layer creation request to a second DCM included in a system controller of the network device;
creating the requested PPPoE interface layer with a PPPoE adapter coupled to the second DCM based on information from the first DCM; and
dynamically building the requested IP interface layer in a dynamic interface stack included in the interface controller with the first DCM based on communication with the PPPoE adapter.

20. The method of claim 13, wherein automatically sensing the one or more protocols comprises checking a length/type field within each of the plurality of packets.

21. The method of claim 13, further comprising authenticating a user associated with the plurality of packets associated with the second VLAN interface based on login information in the packets after dynamically building the interface column for each of the one or more sensed protocols.

22. The method of claim 21, further comprising:
tearing down the interface column when the user associated with the plurality of packets logs out of the network device; and
persistently maintaining the second VLAN interface after tearing down the interface column.

23. The method of claim 21, wherein authenticating the user comprises applying at least one of licensing agreements or Quality of Service (QoS) profiles to the user.

24. The method of claim 1, wherein the network device comprises a router.

25. The method of claim 1, wherein the network device comprises a digital subscriber line access multiplexer (DSLAM) or a network switch.

26. A computer-readable medium comprising instructions that when executed by a programmable processor cause the processor to:
receive a plurality of packets on an Ethernet port of a network device, wherein a first virtual local area network (VLAN) interface is statically built over the Ethernet port;
automatically determine, with the network device, one or more subscribers associated with the plurality of packets; and
in response to receiving the plurality of packets and determining the one or more subscribers associated with the plurality of packets, dynamically build within a network device a second VLAN interface over the first VLAN interface for each of the one or more subscribers.

27. The computer-readable medium of claim 26, wherein the instructions that cause the programmable processor to dynamically build the second VLAN interface cause the programmable processor to:

receive a second VLAN interface creation request with a first dynamic configuration manager (DCM) included in an interface controller of the network device;

forward the second VLAN interface creation request to a second DCM included in a system controller of the network device;

create the requested second VLAN interface with a VLAN adapter coupled to the second DCM based on information from the first DCM; and dynamically build the requested second VLAN interface in a dynamic interface stack included in the interface controller with the first DCM based on communication with the VLAN adapter.

28. The computer-readable medium of claim 26, further comprising instructions that cause the programmable process to:

automatically sense one or more protocols of the plurality of packets; and dynamically build an interface column over the second VLAN interface for each of the one or more protocols sensed from the plurality of packets.

29. The computer-readable medium of claim 28, wherein the instructions that cause the programmable processor to dynamically build the interface column cause the programmable processor to:

dynamically build an Internet Protocol (IP) interface column over the second VLAN interface when the network device senses an IP packet; and dynamically build a Point-to-Point Protocol over Ethernet (PPPOE) interface column over the second VLAN interface when the network device senses a PPPoE packet.

30. The computer-readable medium of claim 28, further comprising instructions that cause the programmable processor to authenticate a user associated with the plurality of packets associated with the second VLAN interface based on login information in the packets after dynamically building the interface column for each of the one or more sensed protocols.

31. The computer-readable medium of claim 30, further comprising instructions that cause the programmable processor to:

tear down the interface column when the user associated with the plurality of packets logs out of the network device; and persistently maintain the second VLAN interface after tearing down the interface column.

32. A network device comprising:

an interface element that includes an interface controller and an Ethernet port;

a forwarding controller that receives a plurality of packets from the Ethernet port and forwards the received packets to the interface controller, wherein a first virtual local area network (VLAN) interface is statically built over the Ethernet port;

an auto-sense module included in the interface controller that automatically senses one or more subscribers associated with the plurality of packets; and a dynamic configuration manager (DCM) included in the interface controller that, in response to the auto-sense module determination of the one or more subscribers associated with the received plurality of packets, dynamically builds within the network device a second VLAN interface over the first VLAN interface for each of the one or more subscribers sensed from the plurality of packets.

33. The network device of claim 32, wherein the first VLAN interface comprises a VLAN major interface and the second VLAN interface comprises a VLAN minor interface.

34. The network device of claim 33, wherein the VLAN major interface comprises a VLAN interface that services one or more subscribers, and the VLAN minor interface comprises a VLAN interface associated with a specific subscriber.

35. The network device of claim 32, wherein the plurality of packets comprises a plurality of Ethernet packets.

36. The network device of clam 32, wherein the Ethernet port comprises one of a Fast Ethernet interface, a Gigabit Ethernet interface, or a 10-Gigabit Ethernet interface.

37. The network device of claim 32, wherein the first VLAN interface automatically senses VLAN encapsulated packets and receives a profile that enables dynamic configuration of second VLAN interfaces.

38. The network device of claim 32, wherein the auto-sense module checks a VLAN identification (VID) within each of the plurality of packets to automatically sense the one or more subscribers associated with the plurality of packets.

39. The network device of claim 38, wherein the VID comprises a single tagged VID that identifies the subscriber that sent the packet.

40. The network device of claim 38, wherein the VID comprises a double tagged VID that identifies the subscriber that sent the packet and a network switch that transmitted the packet from the subscriber to the network device.

41. The network device of claim 32, further comprising a dynamic interface stack included in the interface controller that includes the first VLAN interface and the second VLAN interface dynamically built over the first VLAN interface for each of the one or more sensed subscribers.

42. The network device of claim 41, further comprising an Ethernet module included in the interface controller that determines whether the second VLAN interface for each of the one or more sensed subscribers already exists in the dynamic interface stack.

43. The network device of claim 42, wherein the Ethernet module processes each of the plurality of packets with the second VLAN interface corresponding to the sensed subscriber of the respective packet when the second VLAN interface exists; and wherein the DCM dynamically builds a second VLAN interface over the first VLAN interface for each of the one or more sensed subscribers when the second VLAN interface does not already exist.

44. The network device of claim 32, wherein the DCM comprises a first DCM included in the interface controller, the network device further comprising a system controller that includes a second DCM and a VLAN adapter coupled to the second DCM, wherein the first DCM receives a second VLAN interface creation request and forwards the second VLAN interface creation request to the second DCM, wherein the VLAN adapter creates the requested second VLAN interface based on information from the first DCM, and wherein the first DCM dynamically builds the requested second VLAN interface in a dynamic interface stack included in the interface controller based on communication with the VLAN adapter.

45. The network device of claim 32, wherein the DCM dynamically builds a second VLAN interface associated with a subscriber over the first VLAN interface; and wherein a system administrator statically builds another second VLAN interface associated with another subscriber over the first VLAN interface.

46. The network device of claim 32, wherein:
the auto-sense module automatically senses one or more protocols of the plurality of packets; and
the interface controller dynamically builds an interface column over the second VLAN interface for each of the one or more protocols sensed from the plurality of packets.

47. The network device of claim 46, wherein:
the DCM dynamically builds a Point-to-Point Protocol over Ethernet (PPPoE) interface column over the second VLAN interface when the auto-sense module senses a PPPoE protocol; and
an Inet manager included in the interface controller dynamically builds an Internet Protocol (IP) interface column over the second VLAN interface when the auto-sense module senses an IP protocol.

48. The network device of claim 47, wherein the Inet manager comprises a first Inet manager included in the interface controller, the network device further comprising a system controller that includes a second Inet manager and an IP subscriber manager coupled to the second Inet manager,
wherein the first Inet manager receives an IP interface layer creation request and forwards the IP interface layer creation request to the second Inet manager,
wherein the IP subscriber manager creates the requested IP interface layer based on information from the first Inet manager, and
wherein the first Inet manager dynamically builds the requested IP interface layer in a dynamic interface stack included in the interface controller based on communication with the IP subscriber manager.

49. The network device of claim 48, wherein the first Inet manager dynamically builds the IP interface column without creating subscriber interfaces.

50. The network device of claim 47, wherein the DCM comprises a first DCM included in the interface controller, the network device further comprising a system controller that includes a second DCM and a PPPoE adapter coupled to the second DCM,
wherein the first DCM receives a PPPoE interface layer creation request and forwards the PPPoE interface layer creation request to the second DCM,
wherein the PPPoE adapter creates the requested PPPoE interface layer based on information from the first DCM, and
wherein the first DCM dynamically builds the requested IP interface layer in a dyramic interface stack included in the interface controller based on communication with the PPPoE adapter.

51. The network device of claim 46, wherein the auto-sense module checks a length/type field within each of the plurality of packets to automatically sense the one or more protocols of the plurality of packets.

52. The network device of claim 46, wherein the interface controller authenticates a user associated with the plurality of packets associated with the second VLAN interface based on login information in the packets after dynamically building the interface column for each of the one or more sensed protocols.

53. The network device of claim 52, wherein the interface controller:
tears down the interface column when the user associated with the plurality of packets logs out of the network device; and
persistently maintains the second VLAN interface after tearing down the interface column.

54. The network device of claim 32, wherein the network device comprises a router.

55. The network device of claim 32, wherein the network device comprises a digital subscriber line access multiplexer (DSLAM) or a network switch.

\* \* \* \* \*

UNITED STATES PATENT AND TRADEMARK OFFICE
CERTIFICATE OF CORRECTION

PATENT NO. : 7,606,232 B1 Page 1 of 1
APPLICATION NO. : 11/331584
DATED : October 20, 2009
INVENTOR(S) : Ruben et al.

It is certified that error appears in the above-identified patent and that said Letters Patent is hereby corrected as shown below:

Column 20, line 13 (Claim 50), "dyramic" should read -- dynamic --

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.      : 7,606,232 B1
APPLICATION NO. : 11/331584
DATED           : October 20, 2009
INVENTOR(S)     : Ruben et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Fifth Day of October, 2010

David J. Kappos
*Director of the United States Patent and Trademark Office*